United States Patent [19]
Ibe et al.

[11] Patent Number: 5,141,768
[45] Date of Patent: Aug. 25, 1992

[54] METHOD AND APPARATUS FOR CORRECTING DYNAMIC BALANCE OF ROTATING BODY

[75] Inventors: Hiromitu Ibe; Akira Yamano, both of Kosai, Japan

[73] Assignee: Asmo Co., Ltd., Shizuoka, Japan

[21] Appl. No.: 557,800

[22] Filed: Jul. 26, 1990

[30] Foreign Application Priority Data

Aug. 2, 1989 [JP] Japan ................................. 1-201105

[51] Int. Cl.⁵ .............................................. B05D 5/00
[52] U.S. Cl. .................................... 427/10; 118/669; 118/670; 118/712; 427/8; 427/53.1; 427/256; 427/287
[58] Field of Search ....................... 427/8, 240, 10, 287, 427/256, 53.1; 118/668, 712, 669, 670, 712

[56] References Cited

U.S. PATENT DOCUMENTS

| | | | |
|---|---|---|---|
| 2,937,613 | 5/1960 | Larsh | 118/669 |
| 3,130,075 | 4/1964 | Larsh | 118/669 |
| 3,506,478 | 4/1970 | Hudson et al. | 427/8 |
| 3,939,020 | 2/1976 | Caramanian et al. | 156/64 |
| 3,996,883 | 12/1976 | Gusarov et al. | 118/669 |
| 4,042,723 | 8/1977 | Presby | 427/8 |
| 4,083,735 | 4/1978 | Caramanian | 156/64 |
| 4,418,093 | 11/1983 | Gomberg et al. | 427/8 |

FOREIGN PATENT DOCUMENTS

| | | |
|---|---|---|
| 199386 | 8/1965 | Fed. Rep. of Germany . |
| 62-203535 | 9/1987 | Japan . |
| 63-92639 | 4/1988 | Japan . |
| 410066 | 5/1934 | United Kingdom . |

Primary Examiner—Janyce Bell
Attorney, Agent, or Firm—Venable, Baetjer, Howard & Civiletti

[57] ABSTRACT

The method and apparatus for correcting the dynamic balance of a rotating body, whereby the correction of the dynamic balance of a rotating body is achieved by fixing a correcting agent on the rotating body after the position of the dynamic unbalance and the amount of the dynamic unbalance in the rotating body are measured, are so constructed as to detect whether or not the correcting agent fixed on the rotating body is protruding from a prescribed configuration of the rotating body. Therefore, the method and the apparatus are capable of not only correcting a dynamic unbalance of a rotating body, but also detecting the protrusion of the correcting agent fixed on the rotating body.

25 Claims, 7 Drawing Sheets

METHOD AND APPARATUS FOR CORRECTING DYNAMIC BALANCE OF ROTATING BODY

FIELD OF THE INVENTION

The present invention relates to a method and an apparatus for correcting the unbalance of a rotating body, whereby the unbalance of a rotating body, such as a rotor, is corrected by placing a correcting agent or balancing composition on the rotating body.

BACKGROUND OF THE INVENTION

Prior Art

Dynamic balance correcting apparatuses for correcting the unbalance of a rotating body, such as a rotor, have hitherto been known to achieve such a correction by placing a correcting agent (the so-called putty), for example, the composition now known publicly through disclosure by the Official Gazette for Patent Laid Open No. 63-92639, after measuring the state of dynamic unbalance of the rotating body, such as a rotor for a motor.

A dynamic balance correcting apparatus of the kind described above determines the position and amount of unbalance on the basis of the result of measurement of the state of unbalance in a rotating body (which is generally called "the work") and then discharging a prescribed amount of a correcting agent from a nozzle or the like on the basis of the position and amount of the unbalance so determined. After such a prescribed amount of the correcting agent is discharged, such an apparatus cuts off the correcting agent by means of an air cutting device or the like, thereby disconnecting the said correcting agent from the nozzle, and sticks the said correcting agent to the rotating body.

Now, such a correcting agent thus stuck to the unbalanced part of a rotating body protrudes in some cases from the prescribed limits of the outer dimensions of the rotating body. In case such a rotating body should be used as a rotor for a motor, it would cause such troubles as a failure in the rotation of the motor because of the interference which such a protruding part causes with the magnet at the side of the yoke or because of a failure in securing the dynamic balance of the rotor as the result of the falling off of the correcting agent.

Therefore, in order to prevent such troubles as those just described, a dynamic balance correcting apparatus for rotating body whereby the correcting agent attached to the rotating body can be thrust down to be secured in a fixed position been proposed (each in the Official Gazette for Patent Laid Open No. 62-203535 and the Official Gazette for Publication of Utility Model No. 63-39655). This dynamic balance correcting apparatus is provided with a pressing member soaked with fluid. The correcting agent cut off from the nozzle and stuck to the rotating body is pushed down by force with this pressing member, and the correcting agent thus stuck on the unbalanced part of the rotating body can be prevented thereby from protruding beyond the prescribed limits of the outer dimensions of the rotating body.

Problems with Existing Apparatuses

However, the existing dynamic balance correcting apparatuses for a rotating body, such as those described above, have a defect in that they fail to detect or to ascertain a protrusion of the correcting agent in case the securing of the correcting agent with the pressing member mentioned above is not complete, that is, in case the correcting agent still remains protruding from the prescribed limits of the outer dimensions of the rotating body. Moreover, the prior art apparatuses are likewise not capable of detecting or ascertaining any protrusion formed afresh of the correcting agent in consequence of the lack of thorough hardening in the correcting agent in the processes subsequent to this pressing process (namely, the process for verifying the ultimate state of balance and the hardening process of the correcting agent).

Therefore, the existing apparatuses require the workers to perform an inspection on all the units of the rotating body to check on the state of protrusion of the correcting agent by their manual work, which causes the problem that the working efficiency is deteriorated to a very considerable degree. In such a case, moreover, visual inspection performed by workers is necessarily liable to the occurrence of a lack of uniformity in the results of such inspection, which makes it difficult to guarantee any stable product quality.

SUMMARY OF THE INVENTION

The present invention, which has been made in view of the fact mentioned above, has the object of offering a method and an apparatus which are applicable to the correction of the dynamic balance of a rotating body and capable of automatically and accurately detecting and ascertaining also the state of a protrusion of an unbalance correcting agent stuck and pressed on a rotating body in case any dynamic unbalance of a rotating body is to be corrected.

MEANS OF OVERCOMING THE PROBLEMS

The dynamic balance correcting method according to the present invention for application to a rotating body consists in a method of correcting the dynamic balance of a rotating body by measuring the position or location of any dynamic unbalance and the amount of such an unbalance in a rotating body and thereafter placing a correcting agent solidly on the rotating body, thereby effecting a correction of the dynamic balance of the rotating body, wherein the said dynamic balance correcting method for a rotating body is characterized by:

(a) discharging the correcting agent from the discharging part to such a prescribed position on the rotating body as determined on the basis of the above-mentioned measurement of the position of any unbalance in such a prescribed amount as determined on the basis of the result of the above-mentioned measurement of the amount of the unbalance;

(b) cutting off the correcting agent mentioned above by means of a cutting part after its discharge, thereby severing the correcting agent from the discharging part mentioned above and also sticking the correcting agent on the rotating body mentioned above;

(c) verifying again the state of the dynamic balance of the rotating body mentioned above and thereafter hardening by means of a hardening part the correcting agent stuck on the said rotating body; and (d) detecting by means of a protrusion detecting part whether or not the above-mentioned correcting agent stuck solidly is protruding from the prescribed configuration of the rotating body mentioned above.

Accordingly, the method of correcting the dynamic balance of a rotating body as proposed in the present invention is capable of correcting a dynamic unbalance of a rotating body by the steps (a), (b) and (c) described above and also capable of detecting by means of the protrusion detecting part whether or not the correcting agent placed by the step (d) is projecting from the prescribed configuration of the rotating body.

In another form of preferred embodiment of the present invention, the dynamic balance correcting method for correcting the dynamic balance of a rotating body by sticking the correcting agent solidly on the rotating body after measuring the position of a dynamic unbalance and the amount of such an unbalance in the rotating body is characterized by comprising the steps of:

(a) discharging the correcting agent from the discharging part to such a prescribed position on the rotating body as determined on the basis of the above-mentioned measurement of the position of any unbalance in such a prescribed amount as determined on the basis of the result of the above-mentioned measurement of the amount of the unbalance;

(b) cutting off the correcting agent mentioned above by means of a cutting part after its discharge, thereby severing the correcting agent from the discharging part mentioned above and also sticking the correcting agent on the rotating body mentioned above;

(c) verifying again the state of the dynamic balance of the rotating body mentioned above and also detecting by means of a protrusion detecting part whether or not the above-mentioned solidly stuck correcting agent is protruding from the prescribed configuration of the rotating body mentioned above; and (d) thereafter hardening by means of a hardening part the correcting agent stuck on the said rotating body.

Accordingly, the present invention as applied to this form of its preferred embodiment is capable of correcting the dynamic unbalance of a rotating body at the steps (a) and (b) and is also capable of ascertaining at the step (c) the state of the dynamic balance of this rotating body and detecting whether or not the stuck correcting agent is projecting from the prescribed configuration of the rotating body before the correcting agent stuck to this rotating body is hardened at the step (d). Thus, this method permits the re-correction of the dynamic balance of a rotating body in an easy and simple manner since it is capable of detecting the state of protrusion of the correcting agent before the said correcting agent is hardened.

In the meanwhile, the dynamic balance correcting apparatus constructed according to the present invention for application thereof to a rotating body for the purpose of correcting the dynamic balance of a rotating body is provided with:

a measuring part, which measures the position of a dynamic unbalance and the amount of a dynamic unbalance of a rotating body, an applying part, which sticks a prescribed amount of the correcting agent to a prescribed position of the rotating body mentioned above as determined on the basis of the results of the measurement performed by the measuring part mentioned above, and a protrusion detecting part, which detects whether the stuck correcting agent mentioned above is protruding from the prescribed configuration of the rotating body mentioned above.

Accordingly, the dynamic balance correcting apparatus for a rotating body, which is thus provided with a protrusion detecting part, can detect those rotating bodies in which the correcting agent stuck thereon projects in excess of the prescribed configuration limit, so that it is thereby made possible to prevent the forwarding of such defective rotating bodies like those just described to the subsequent process, for example, the assemblage of the rotating body into another component part, and an improvement is thereby made on the working efficiency in the processes.

Moreover, the apparatus in another embodiment of the present invention is provided with a pressing part, which forces down the above-mentioned correcting agent stuck on the rotating body mentioned above and thereby fixes the said correcting agent on the said rotating body. Therefore, the apparatus is capable of securely keeping the correcting agent fixed on the rotating body, so that the correcting agent is not liable from falling off in the protrusion detecting part, and this ensures that the detecting operation can be performed with certainty.

Another form of embodiment of the apparatus according to the present invention is provided further with a balance verifying part, which checks on the dynamically balanced state of the rotating body, and a hardening part, which hardens the correcting agent fixed on the rotating body mentioned above. Therefore, the apparatus, working by itself, can perform all the correcting steps, achieving an improvement on the working efficiency in the process and also realizing the construction of the apparatus in a compact size.

Another embodiment of the apparatus according to the present invention offers a protrusion detecting method, which detects whether or not the correcting agent fixed on the rotating body mentioned above for correcting the dynamic balance of the said rotating body is protruding beyond the prescribed configuration of the said rotating body. This protrusion detecting method consists in:

(a) the step for supporting the rotating body mentioned above in such a manner as to permit its rotation round its axis, and (b) the step for detecting whether or not the correcting agent mentioned above is protruding beyond the prescribed configuration of the rotating body mentioned above while turning the said rotating body round its axis as mentioned above.

With this construction, the rotating body is held at the step (a) in such a manner as to permit its rotation round its axis, and it is detected at the step (b) whether or not the correcting agent mentioned above is protruding in excess of the prescribed configuration of the rotating body mentioned above while the rotating body is kept in its rotation. Therefore, with the protrusion detecting means arranged in a prescribed position round the axis of the rotating body, it is possible to detect the state of protrusion of the correcting body on the entire circumference in the rotating direction of the said rotating body.

It is possible to perform the step (b) by bringing a movable moving member into contact with the correcting agent and then detecting the amount of movement of this moving member.

Also, this step (b) can be taken with a construction wherein a beam of light like a laser beam is irradiated in the tangential line direction in relation to the prescribed configuration of the rotating body, and it is judged that the amount of protrusion of the correcting body is in excess of the prescribed configuration of the rotating body in case this beam of light cannot be received or in case the beam of light is received in a reduced quantity.

In another form of embodiment of the present invention, it is possible to obtain a protrusion detecting device which detects whether or not the correcting agent fixed on the rotating body mentioned above for correcting the dynamic balance thereof is projecting beyond the prescribed configuration of the said rotating body. This protrusion detecting device is provided with a supporting means, which hold the rotating body mentioned above in such a manner as to permit the said rotating body to rotate round its axis, a driving means, which rotates the said rotating body round its axis, and a protrusion detecting means, which is arranged in a manner corresponding with the configuration of the above-mentioned rotating body and detects whether or not the correcting agent mentioned above projects beyond the prescribed limit of the configuration mentioned above while the rotating body mentioned above is in its rotating motion by the action of the driving means mentioned above. With this construction, it is possible to detect by the detecting means whether or not the correcting agent projects beyond the prescribed configuration limit of the rotating body while the rotating body is rotated round its axis by the driving means.

For a detecting means, it is possible to provide a moving member, which is moved by its direct contact with a correcting member, and a detecting part, which moves this moving member. Also, the detecting part may be constructed in such a manner that it detects the amount of movement of the moving member and then to indicate the detected amount of movement.

As for other detecting means, it is possible to provide a beam irradiating means, which irradiates a beam of light in the direction of a tangential line in relation to the prescribed configuration of the rotating body, and a light receiving means, which is arranged in a position opposite to this beam irradiating means and receives the beam of light irradiated therefrom. The protrusion detecting means is then provided with a determining means, which determines that the correcting agent is projecting beyond the prescribed configuration of the rotating body in case the projecting detecting means finds that the beam of light irradiated from the beam irradiating means cannot be received by the light receiving means or in case the said beam of light is received in a reduced quantity by the said light receiving means.

For the beam irradiating means, it is possible to use a laser light emitting unit, which irradiates rays of laser light, and, for the light receiving means, it is possible to employ a laser light detecting unit.

BRIEF DESCRIPTION OF THE DRAWINGS

The manner by which the above objects and other objects, features and advantages of the present invention are attained will be fully evident from the following detailed description when it is considered in light of the drawings, wherein.

DETAILED DESCRIPTION OF THE INVENTION

Reference will now be made in detail to the construction of the dynamic balance correcting apparatus according to the present invention as illustrated in the accompanying drawings, in which like reference numbers designate like or corresponding parts throughout the several drawings.

In the description to follow, some preferred embodiments of the present invention will be used as examples. It should be understood, however, that the present invention is not limited to these examples of its embodiment, but may be applied effectively to other forms of its embodiment to such an extent as will not deviate from the technical scope defined for the present invention.

Figure 1:
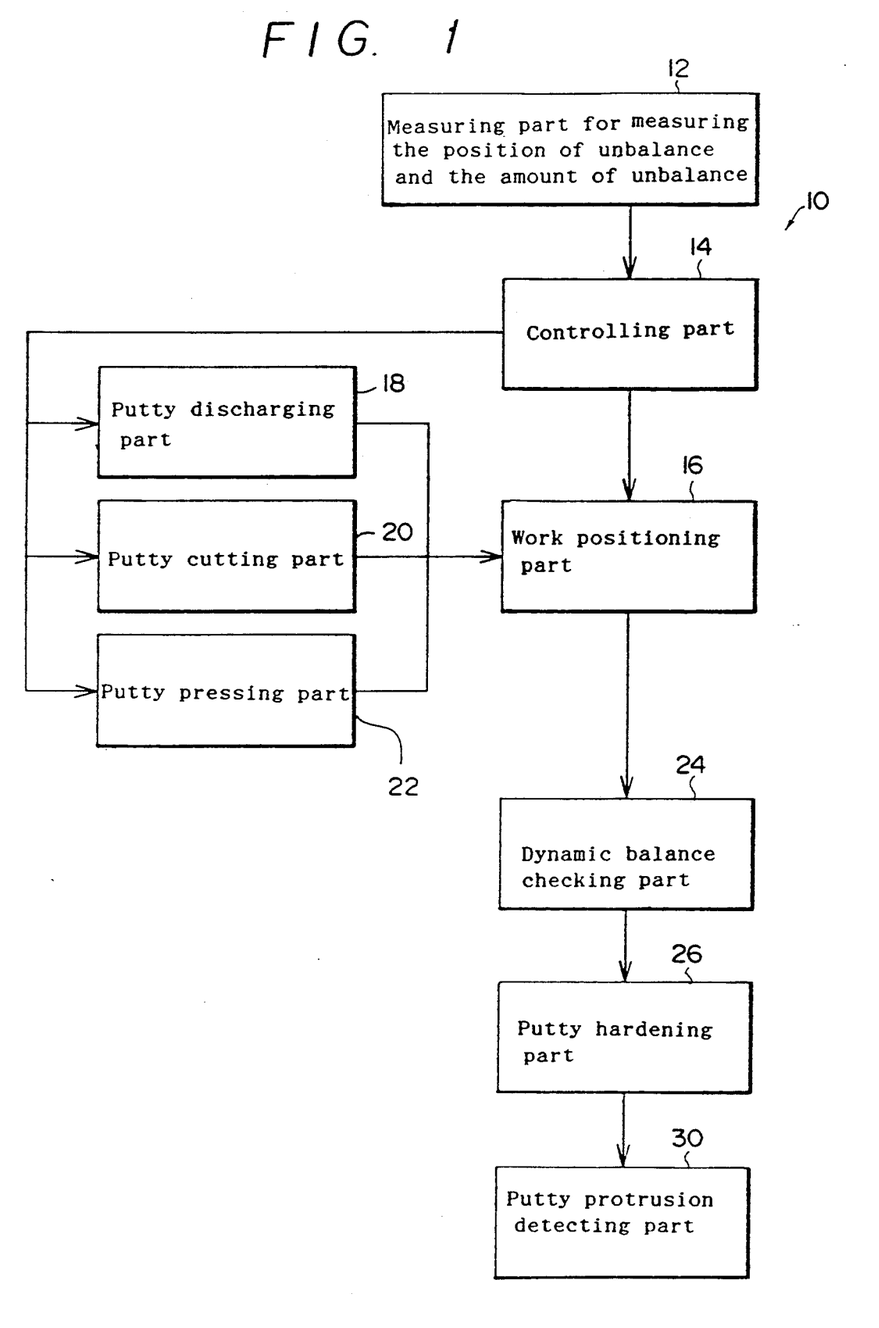
FIG. 1 is a block diagram illustrating an outline of the overall construction of the dynamic balance correcting apparatus for a rotating body according to the first example of preferred embodiment of the present invention.

In FIG. 1, the overall construction of the dynamic balance correcting apparatus 10 for a rotating body in the first example of preferred embodiments of the present invention is illustrated in outline in the form of a block diagram.

This dynamic balance correcting apparatus 10 is provided with a measuring part 12, which measures the state of the dynamic unbalance, namely, the position of the unbalance and the amount of the unbalance, in a rotating body (Work) W, such as a rotor for a motor, and is further provided with a controlling part 14, which determines the position of application and the quantity of application of putty P used as the correcting agent to the work W on the basis of the results obtained from the measurement of the position of the unbalance and the amount of the unbalance just described.

To this controlling part 14 is connected a work positioning part 16, with which the apparatus is capable of automatically setting the work W in the position for the application of the putty P as determined by the controlling part 14.

Also connected to the controlling part 14 are a putty discharging part 18, which discharges the putty P through a nozzle onto the position for a correction (the position on which the putty is to be placed) on the work W as set by the work positioning part 16, a putty cutting part 20, which cuts off the putty P discharged from the nozzle after its discharge in the prescribed amount, thereby severing the putty from the putty discharging part 18 and also sticking the putty on the work W, and a putty pressing part 22, which pushes down the putty P placed on the work W and fixing the putty in place on the work W. These individual parts are controlled by the controlling part 14, and it is therefore possible for the apparatus to apply the putty P automatically in a manner suitable for the particular state of the unbalance of the work W.

The work W on which the putty P is fixed in the work positioning part 16 is transported to the balance checking part 24. This balance checking part 24 basically has the same construction as that of the measuring part 12 mentioned above and is capable of verifying the state of the dynamic balance in the work W after the putty P is fixed thereon.

The work W in the state of balance as re-ascertained by the balance checking part 24 is transported to the putty hardening part 26, which forces the putty P placed on the work W to harden and to be fixed on the work W.

Figure 2:
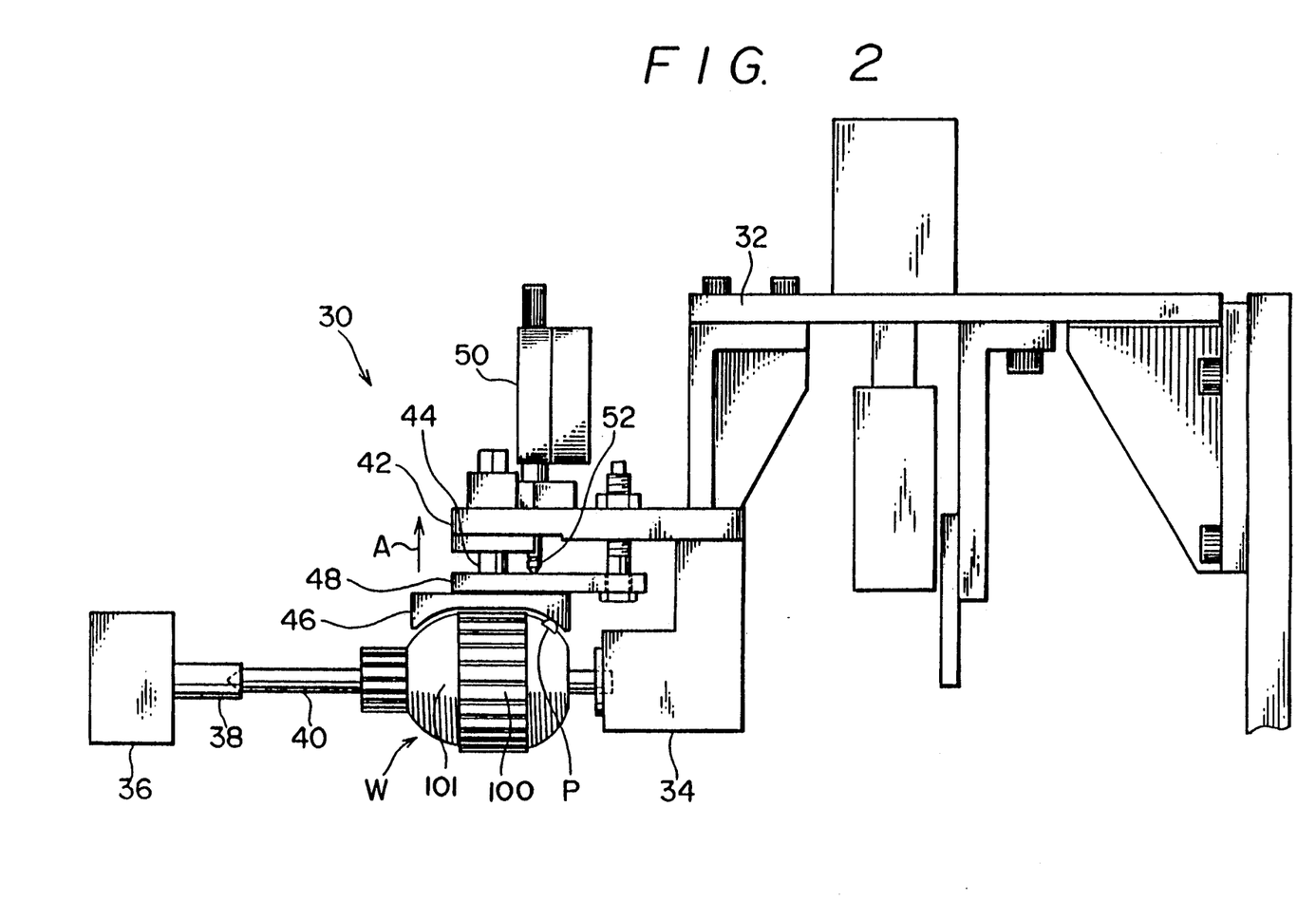
FIG. 2 is a side view of the putty protrusion detecting part in the dynamic balance correction apparatus.

The work W with the putty P hardened and fixed thereon by the putty hardening part 26 is transported to the putty protrusion detecting part 30. FIG. 2 shows the construction of this putty protrusion detecting part 30.

The work W has an steel core 100 shaped into an approximately round column with coil winding 101 wound around the said core and also with a shaft 40 penetrating its shaft core.

The fixing jig 32 in the putty protrusion detecting part 30 has a shaft rest 34 fixed thereon, and this shaft rest 34 is used for holding the work W in its place. In the position opposite to the shaft rest 34 is arranged a motor 36 for the rotation of the work W, and, additionally, a chuck 38 is fitted to the rotating shaft of the motor 36. With the shaft 40 of the work W engaged securely with this chuck 38, the work W is set between the motor 36 and the shaft rest 34, so that the work W can be set into its rotation by the motor 36.

Figure 2A:
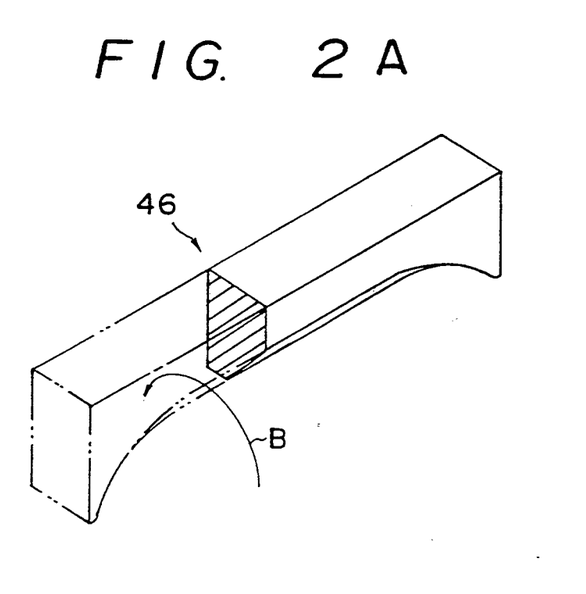
FIG. 2A is a perspective view of the guide plate.

In the meantime, a supporting base 42 is fixed at a point above the shaft rest 34 with an extension of the said supporting base in the direction of the motor 36, namely, in the direction towards the work W as set in place. At a point below this supporting base 42 as thus set, a guide plate 46 is mounted with a bolt 44, which is set in such a manner as to be able to move in relation to the supporting base 42 and has a construction with a guide plate 46 mounted by way of a base plate 48 fixed on the lower end part. Owing to this construction, also the guide plate 46 (i.e. the base plate 48) can move in the direction indicated by the arrow mark A in FIG. 2 in relation to the supporting base 42. The guide plate 46 is made in a shape corresponding to the outer shape of the work W. That is to say, the guide plate 46 has its surface confronting the work W forming a curved surface in a concave shape towards the inward direction in correspondence with the outer shape of the work W, as illustrated in FIG. 2A, and, in addition, this confronting surface at the side for the entry of the work W as rotated in the direction indicated by the arrow mark B in FIG. 2A forms a surface aslant in the direction for the movement away from the work W. Accordingly, the direct contact with the putty P fixed on the work W rotated by the motor 36 is made on this slanting surface, with the guide plate 46 moving smoothly in the direction indicated by the arrow mark A in FIG. 2.

Also, the guide plate 46 is set in the position away by a prescribed length from the work W between the motor 36 and the shaft rest 34. In other words, the shape and setting position of the guide plate 46 are determined in correspondence with the maximum permissible outside dimensions of the work W.

Moreover, a dial gauge 50 is mounted on the supporting base 42. The pickup 52 of the dial gauge 50 is in its direct contact with the upper surface of the base plate 48. Owing to this setup, it is possible to detect the amount of movement when the guide plate 46 moves in the direction indicated by the arrow mark A in FIG. 2.

Next, a description is made of the working of this example of preferred embodiment.

With the dynamic balance correcting apparatus 10 in the construction described above, the position of a dynamic unbalance and the amount of a dynamic unbalance are measured of the work W by the measuring part 12 and thereafter the putty P is discharged automatically from the putty discharging part 18 onto the work W as set in its position by the work positioning part 16 and, after a prescribed quantity of the putty is discharged, the putty is cut off by the putty cutting part 20, and then the putty pressing part 22 is put into operation and presses and fixes the putty P placed on the work W.

Subsequently, the state of the balance of this work W is rechecked by the balance checking part 24, and the work W is further transported to the putty hardening part 26, which forces the work W to harden and fixes the putty P stuck thereon.

After the hardening of the putty P, the putty protrusion detecting part 30 detects whether or not the putty P solidly fixed on the work W is projecting from the prescribed configuration of the work W.

In the putty protrusion detecting part 30, the work W with the putty solidly fixed thereon is set between the motor 36 and the shaft rest 34, and the work W is rotated by the motor 36. Here, in case the pressing of the putty P by the putty pressing part 22 is not complete, namely, in case the putty P is still projecting beyond the prescribed configuration of the work W, or in case any new protrusion has been formed of the putty P because the putty P has not yet hardened completely, such a projecting part of the putty P thrusts the guide plate 46 along with the rotation of the work W. In consequence of this, the guide plate 46 moves, together with the base plate 48, in the direction indicated by the arrow mark A in FIG. 2. Since the pickup 52 is held in direct contact on the upper surface of the base plate 48, the pickup 52 moves along with the movement of the base plate 48, and the amount of this movement, namely, the amount of the projecting part of the putty P, is indicated on the dial gauge 50.

Thus, in case the putty P is projecting beyond the maximum permissible outside dimensions of the work W, the apparatus according to the present invention can automatically detect any such protrusion of the putty P.

Therefore, the apparatus according to the present invention eliminates the necessity of any manual work inspection otherwise required of the worker for checking the state of any protrusion that may be present in the putty P after the process for the hardening of the putty P, as is the case with the conventional process with the prior art apparatus, and accordingly the method and apparatus herein proposed achieves an extremely improved level of working efficiency. Furthermore, this apparatus makes it unnecessary for the worker to perform any visual inspection, which was required of the worker operating with the prior art apparatus, and makes it possible to guarantee a certain level of product quality since there will not be any dispersion or overlooked fault in the results of inspection. In this regard, an experiment conducted by the present applicant has conclusively demonstrated that the apparatus according to the present invention is capable of automatically detecting even a protrusion of the putty in excess even by 0.15 mm of the maximum permissible dimensions of the work W. Furthermore, the state of protrusion of the putty P could be determined accurately in an inspection of a total of 4,000 pieces of the work W.

In this example of preferred embodiment, an armature for a rotary electric machine, which is a type of armature used for a motor in a cylindrical shape, has been used as the work W. Moreover, tne plus balancer AE5 manufactured by Shimadzu Seisakusho Ltd. is used as the components for the construction of the measuring part 12, the controlling part 14, the work positioning part 16, the putty discharging part 18, the putty cutting part 20, the putty pressing part 22, and the balance checking part 24. In addition, a heated air recirculating type drying furnace manufactured by Tokiwa Kogyo Kabushiki Kaisha (Tokiwa industries, Ltd.) is used as the putty hardening part 26. The inside temperature in this heated air recirculating type drying furnace is set at 150 degrees centigrade.

Figure 3:
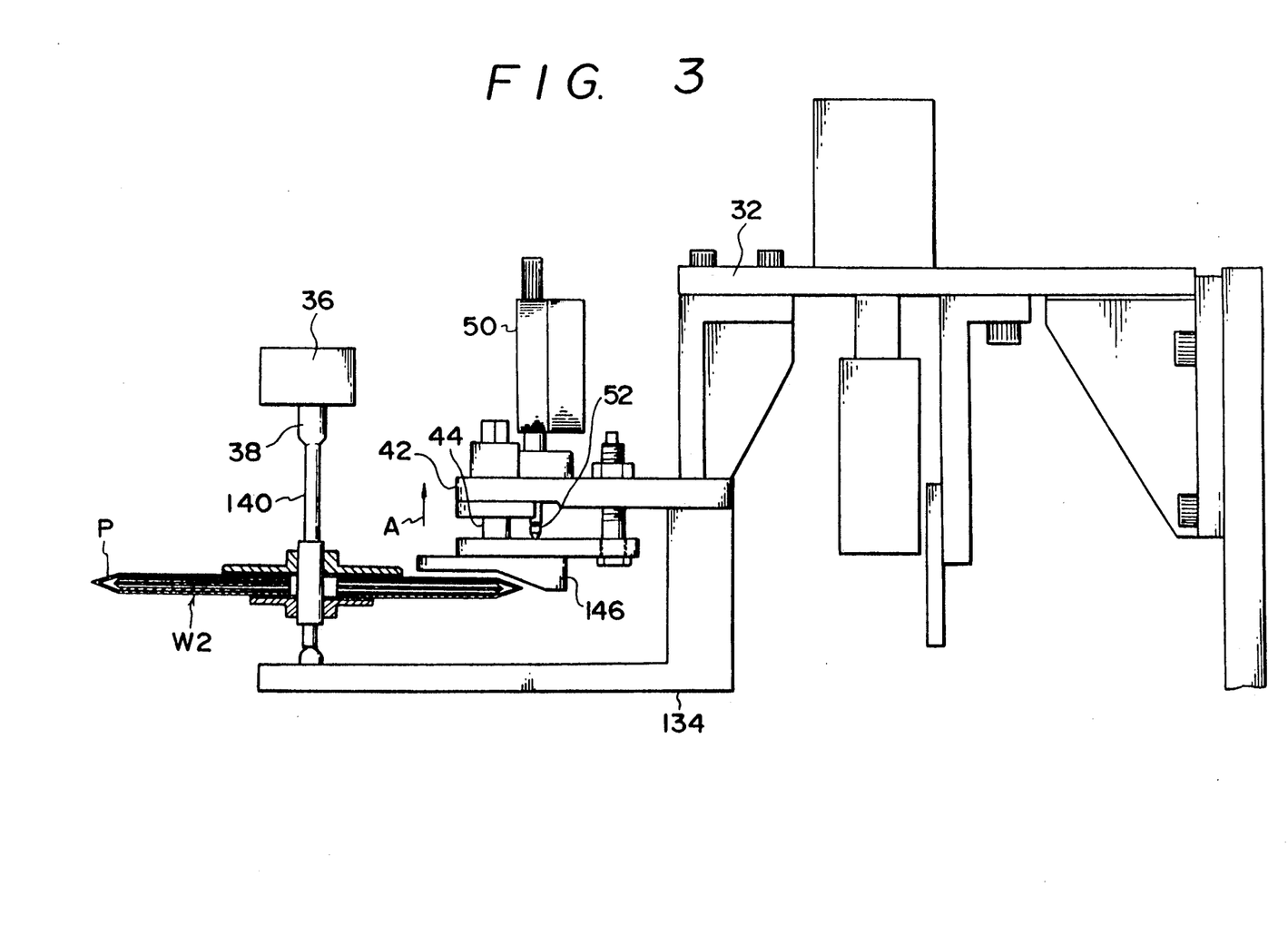
FIG. 3 illustrates a modified construction of the first example of preferred embodiment and is a side view illustrating the putty protrusion detecting part in correspondence with FIG. 2.

Next, a modified form of the first example of preferred embodiment is described with reference to FIG. 3.

In the description of this modified form of embodiment, those components, parts, or the like which are identical to those used in the first example of preferred embodiment are omitted from the description, merely citing here the reference numbers or codes used for representing them in the description of the first example of preferred embodiment.

The shape of the work W2, which is to be inspected by the putty protrusion detecting part 130 in this modified form of the first example of preferred embodiment, is different from the shape of the work W in the first example. This work W2 has a shaft 140 in its center and is in a flat disk shape on the whole, with its peripheral region being formed in a tapered shape which becomes more and more slender towards its edge.

The putty protrusion detecting part 130 is so constructed that it detects the putty P, holding the work W2 in such a manner that the axial line thereof is directed in the upward-downward direction. That is to say, the shaft rest 134 is formed in an approximately L-letter shape and its longer side is extended in an approximately horizontal direction (that is, in the left upward direction in FIG. 3) in a length larger as compared with the length of the longer side of the shaft rest 34 in the first example of preferred embodiment. In an upward area opposite to the part in the proximity of the forward end of this longer side, a motor 36 is arranged in such a manner that its rotating shaft is directed downward. At the top part of the rotating shaft of the motor 36 is mounted a chuck 38, by which the shaft 140 of the work W2 is held securely in its fixed position. The work W2 is set between the shaft rest 34 and the chuck 38 and is thereafter rotated by the motor 36.

In the meantime, the guide plate 146, which is supported on the supporting base 42, is arranged in such a manner as to confront the surface on one side of the work W2, and the shape of the confronting surface of the said guide plate 146 is provided with a flat surface opposite to the flat surface in the center of the work W2 and with a slanting surface opposite to the slanting surface in the peripheral region of the work W2, so that the said surface of the said guide plate 146 may fit to the surface on one side of the work W2 with which the said guide plate 146 is to be set.

The rest of the construction is omitted from the description here as it is identical to the corresponding parts in the first example of preferred embodiment.

Also the working of this modified form of the first example of preferred embodiment is omitted from the description made here as it is almost identical to the working of the apparatus in the first example of preferred embodiment except for the point that the work W2 is rotated by the motor 36 with the axial center of the shaft 140 of the work W2 being set in such a direction as to be oriented towards the upward-downward direction.

Moreover, the work W2, which is used in this modified form of the first example of embodiment is an armature used for a flat-shaped motor.

Next, a description is made of a second example of preferred embodiment of the present invention. In this regard, those parts which are basically the same as those used in the example of preferred embodiment given above are omitted from the description made here, with the same reference numbers or codes being merely cited here.

Figure 4:
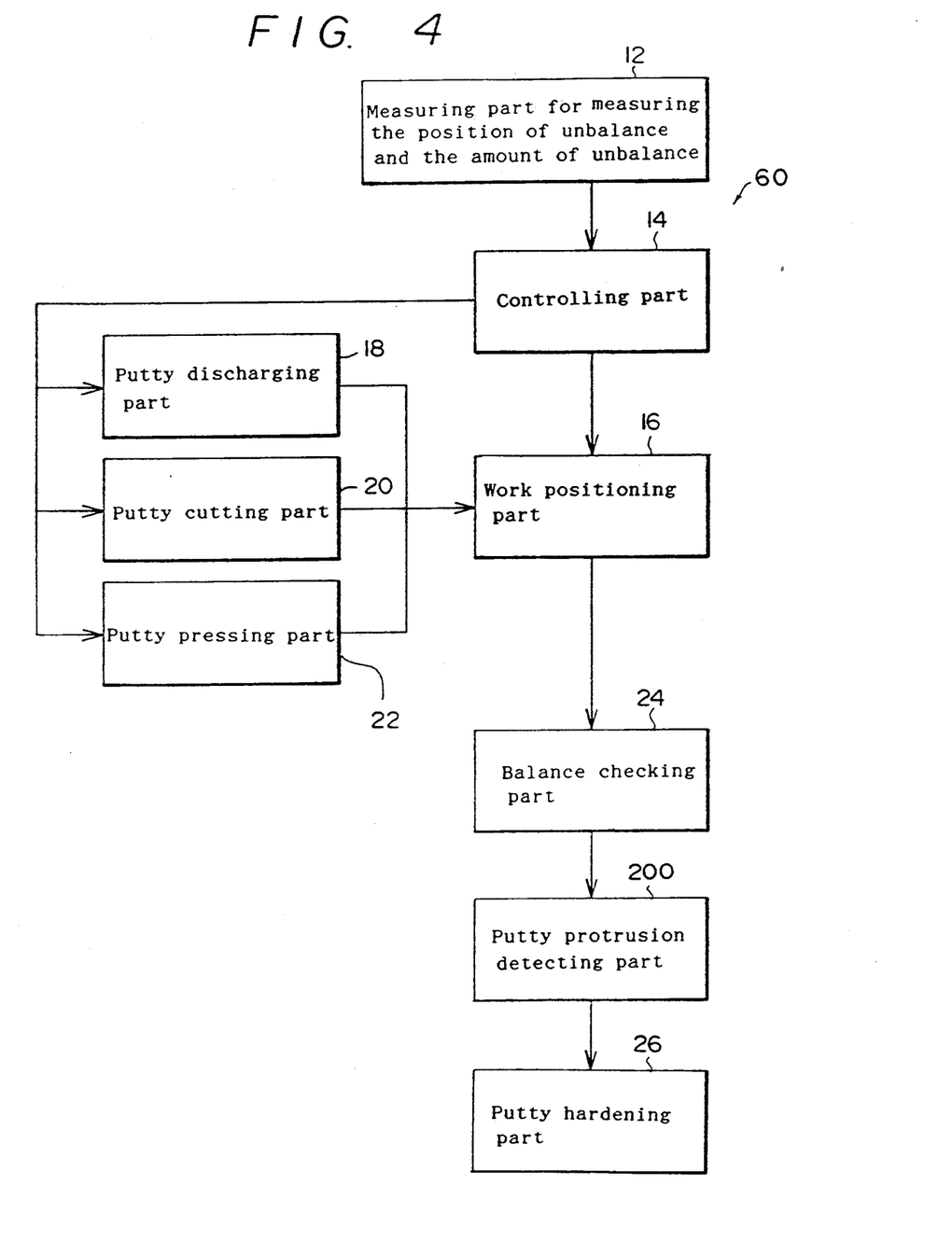
FIG. 4 is a block diagram illustrating the overall construction of the dynamic balance correcting apparatus for a rotating body according to the second example of preferred embodiment of the present invention.

FIG. 4 presents a block diagram in schematic representation of the overall construction of the dynamic balance correcting apparatus 60 in the second example of preferred embodiment.

In this dynamic balance correcting apparatus 60, the work W on which the putty P is placed by the work positioning part 16 is transported to the dynamic balance checking part 24, which checks on the state of balance in the work W and then transports the work W forward to the putty protrusion detecting part 200. When it is verified by the putty protrusion detecting part 200 that the state of the deposition of the putty P is within the prescribed configuration of the work W, then the process for the hardening of the putty P placed on the work W is performed by the putty hardening part 26.

Figure 5:
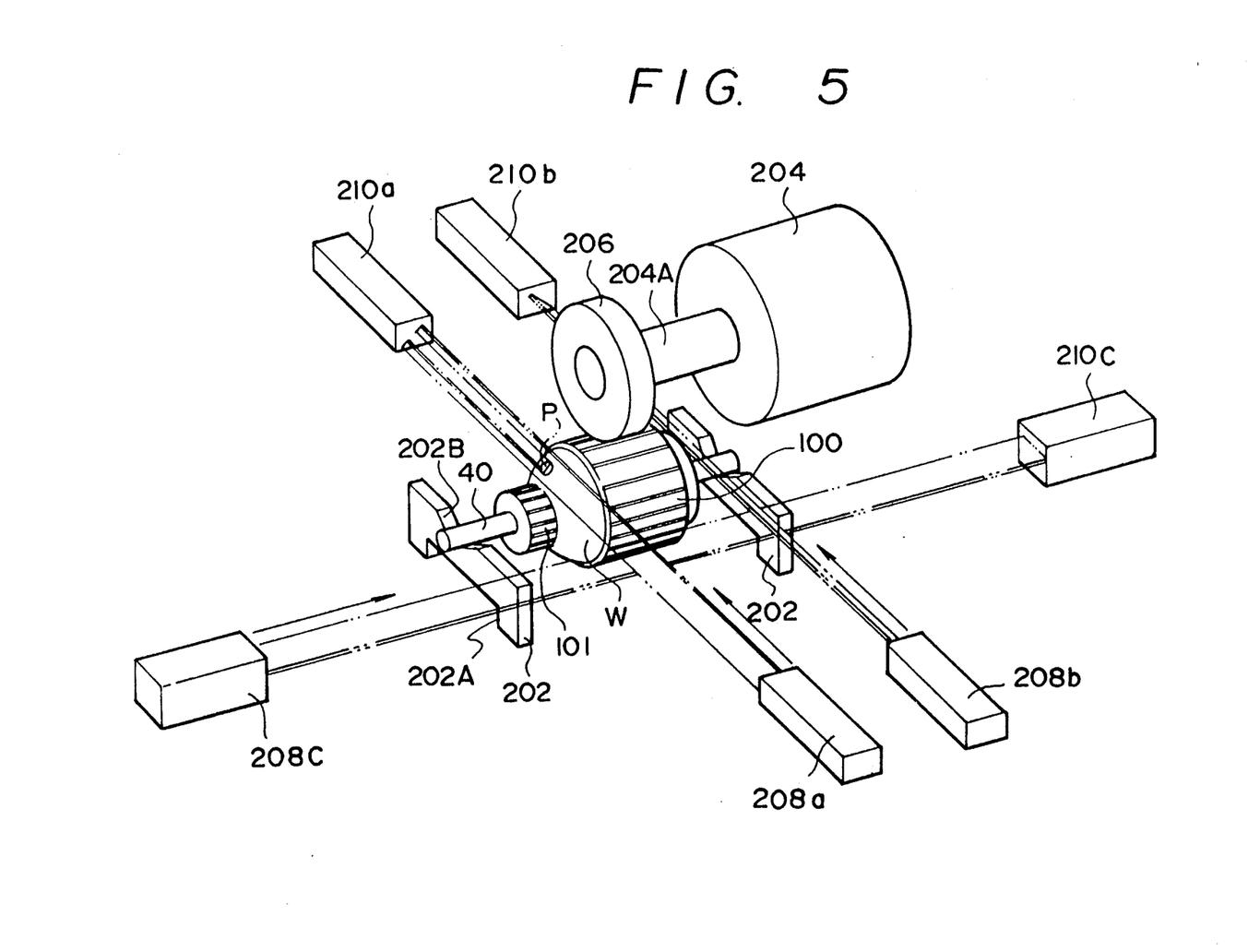
FIG. 5 is a perspective view illustrating the putty protrusion detecting part in the dynamic balance correcting apparatus in the second example of preferred embodiment of the present invention.
Figure 6:
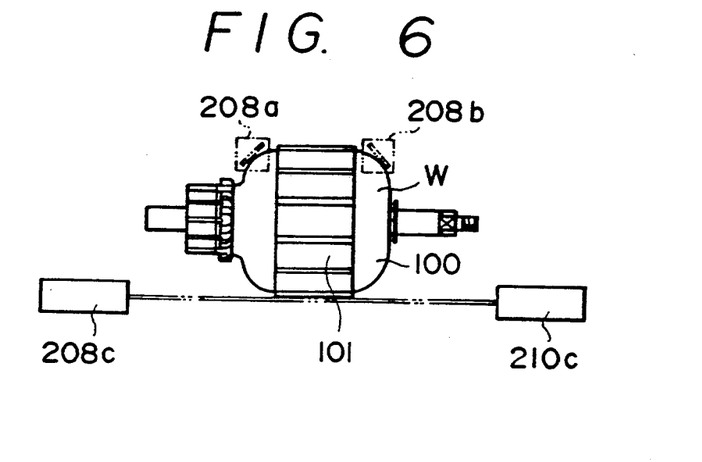
FIG. 6 is a front view illustrating the principal parts of the putty protrusion detecting part in the dynamic balance correcting apparatus in the second example of preferred embodiment of the present invention.
Figure 7:
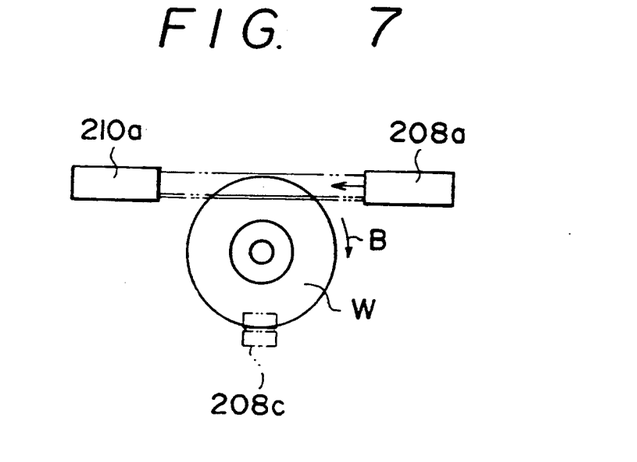
FIG. 7 is a side view illustrating the principal parts of the putty protrusion detecting part in the dynamic balance correcting apparatus in the second example of preferred embodiment of the present invention.

A detailed description is now made of this putty protrusion detecting part 200 with reference to FIG. 5, FIG. 6, and FIG. 7.

In this example of preferred embodiment, the work W to be processed for the correction of its dynamic balance has the same shape as that of the work W in the first example of preferred embodiment.

The putty protrusion detecting part 200 is provided with a pair of rests 202, which are mounted by its two ends on the shaft 40 of the work W and support the work W in such a manner that the axial line of the shaft 40 is kept horizontal. The rests 202 are made of plate approximately rectangular in shape, and a notch 202A in the shape of a rectangle with the left side open is made in the central part on one longitudinal side of the rest 202 and, at the same time, a notch 202B in the shape of an upright triangle is made in the central part of the other longitudinal side of the said rest 202 and, with these notches, the rest 202 is formed approximately in the shape of a gate. The notch 202B is applied as the mounting part for the shaft 40 of the work W.

Also, the putty protrusion detecting part 200 is provided with a driving part which is used for rotating the work W in its rotating motion centering around the shaft 40. This driving part is provided with a motor 204 and a pulley 206, which is fixed on the top part of the output shaft 204A of the motor 204. The driving part constructed in this manner is arranged in such a way that the pulley 206 is put into its direct contact with the outer circumferential surface of the steel core part 100 of the work W as mounted on the rests 202. Accordingly, with the electric power conducted to the motor 204, the pulley 206 is rotated by way of the output shaft 204A, and the rotation of the pulley 206 puts the work W into its rotating motion centering around the shaft 40.

Furthermore, the putty protrusion detecting part 200 is provided with a detecting device which detects whether or not the putty P is projecting beyond the prescribed configuration of the work W. This detecting device is constructed by arranging three sets of a detecting part comprised of a light emitting part 208, which irradiates a beam of laser light therefrom, and a light receiving part 210, which receives the laser light (The individual sets of these parts 208 and 210 are expressed with the affixed marks a, b, and c following the reference number). The light emitting part 208a and the light receiving part 210a, which together form one set, are arranged in such a manner that they are respectively set to face the directions each crossing the other at right angles and that the light emitting part 208a emits a beam of laser light in the direction of the tangential line in relation to the prescribed configuration of one in the pair of the winding parts 101 of the work W. Also, the light emitting part 208b and the light receiving part 210b, which form another set, are arranged in such a manner that they are respectively set to face the directions each crossing the other at right angles and that the light emitting part 208b irradiates a beam of laser light in the direction of a tangential line in relation to the prescribed configuration of the other in the pair of windings 101 of the work W. The light emitting part 208c and the light receiving part 210c, which together form the remaining set, are arranged in such a manner that they are set to face each other in the direction of the axial line of the shaft 40 of the work W and also that the light emitting part 208c will irradiates a beam of laser light in the direction of a tangential line in relation to the prescribed configuration of the steel core part 100 of the work W. The individual light emitting parts, 208a, 208b, and 208c are so constructed as to irradiate a beam of laser light in a flat plane shape while the individual light receiving parts, 210a, 210b, and 210c are constructed so as to receive the beam of laser light in the flat plane shape.

Therefore, in case the putty P placed on the work W is protruding from the prescribed configuration of the work W, the beams of laser light emitted from these individual light emitting parts 208a, 208b, and 208c are interrupted by the putty P, so that the part of the laser light thus interrupted by the putty P will not be received by the individual light receiving parts 210a, 210b, and 210c. In this manner, the apparatus can detect whether or not the putty P is protruding from the prescribed configuration of the work W. In this example of preferred embodiment, moreover, the controlling part 14 is provided with a determining part which determines whether or not the putty P is protruding from the prescribed configuration of the work W on the basis of the result of the detection by the detecting part.

This the putty protrusion detecting part 200 is capable of detecting the state of the protrusion of the putty P by a non-contact detecting process, thereby making it possible to detect the state of the protrusion of the putty P before the putty P placed on the work W is forced to harden by the putty hardening section 26. Also, since the work W is rotated in the putty protrusion detecting part 200, it is possible to re-ascertain the state of balance in the work W through utilization of this rotation, so that it will be possible to construct the dynamic balance correcting apparatus 60 in a more compact size as a whole if the apparatus is designed to perform the check on the dynamic balance of the work W in this the putty protrusion detecting part 200 without any separately provided balance checking part 24.

Moreover, in each of the examples of preferred embodiments described in the foregoing part, the dynamic balance correcting apparatus is realized in a construction in which the state of the protrusion of the putty P is detected by a detecting device which performs such detection by means of a dial gauge or a beam of laser light. However, the detecting means shall not be limited to these. For example, it is feasible to use such detecting means as an optical sensor, a pressure sensor, a magnetic sensor, a linear case, a differential transformer, a limiting switch, or a rotary encoder.

ADVANTAGEOUS EFFECT OF THE INVENTION

As described so far, the method and apparatus proposed in the present invention for the correction of the dynamic balance in a rotating body are capable of automatically and accurately detecting and ascertaining the state of the protrusion of the correcting agent applied to and pressed down onto a rotating body in the process of correcting the dynamic unbalance of the rotating body, thereby producing the advantageous effect that the method and the apparatus achieve a high level of working efficiency and also that the quality of the inspected component parts at a constant level.

What is claimed is:

1. A method of correcting the dynamic balance of a rotatable body, comprising the steps of:
    (a) measuring the location and amount of a dynamic unbalance in the rotatable body;
    (b) applying a balancing composition to the rotatable body dependent on the measurement of the location and amount of the dynamic unbalance in the rotatable body;
    (c) determining the state of the dynamic balance of the rotatable body and detecting the existence of a protrusion of the balancing composition applied to the rotatable body beyond a predetermined dimension of the rotatable body by irradiating a beam of light in the direction of a tangential line of a predetermined outside configuration of the rotatable body while rotating the rotatable body; and
    (d) hardening the balancing composition applied to the rotatable body.

2. A method of correcting the dynamic balance of a rotatable body according to claim 1, wherein the detecting step (c) is performed without any physical contact with the balancing composition.

3. A method of correcting the dynamic balance of a rotatable body according to claim 1, further comprising the step of pressing the balancing composition onto the rotatable body after the applying step (b) such that the balancing composition is fixed to the rotatable body.

4. An apparatus for correcting the dynamic balance of a rotatable body, said apparatus comprising:
    a measuring part which measures the location and position of a dynamic unbalance of the rotatable body;

an applying part which applies an amount of a balancing composition on the rotatable body dependent on the measurement taken by said measuring part; and a protrusion detecting part which detects the existence of the balancing composition on said rotatable body beyond a predetermined dimension of said rotatable body.

5. An apparatus for correcting the dynamic balance of a rotatable body according to claim 4, wherein said applying part comprises:
  a discharging part which discharges the balancing composition and places said discharged balancing composition on the rotatable body;
  a cutting part which cuts off the placed balancing composition from said discharging part; and
  a balance checking part which verifies the state of the dynamic balance of the rotatable body after the balancing composition has been placed thereon.

6. An apparatus for correcting the dynamic balance of a rotatable body according to claim 5, further comprising a pressing part which presses down and fixes the balancing composition onto the rotatable body as the balancing composition is cut off by the cutting part.

7. An apparatus for correcting the dynamic balance of a rotating body according to claim 4, further comprising a hardening part which hardens the balancing composition after placement on the rotatable body by heating said balancing composition.

8. An apparatus for correcting the dynamic balance of a rotatable body according to claim 4, further comprising a hardening part which hardens the balancing composition after the protrusion detecting part detects the existence of protrusion of the balancing composition beyond said predetermined dimension.

9. An apparatus for correcting the dynamic balance of a rotatable body according to claim 4, wherein the protrusion detecting part is configured such that the detecting part physically contacts the balancing composition placed on the rotatable body when the detecting part detects the existence of a protrusion of the balancing composition beyond said predetermined dimension.

10. An apparatus for correcting the dynamic balance of a rotatable body according to claim 4, wherein the protrusion detecting part is configured such that the detecting part does not physically contact the balancing composition placed on the rotatable body when the detecting part detects the existence of a protrusion of the balancing composition beyond said predetermined dimension.

11. A protrusion detecting method for detecting the existence of protrusion of a balancing composition beyond a predetermined dimension of a rotatable body, the balancing composition having been placed on a rotatble body in order to correct the dynamic balance of the rotatable body, said rotatable body having a rotation axis about which the body may rotate, said method comprising the steps of:
  (a) supporting the rotatable body such that the body may rotate about the rotation axis; and
  (c) detecting the existence of protrusion of the balancing composition beyond a predetermined dimension of the rotatable body by bringing a detecting member into close proximity of the rotatable body such that the detecting member will make contact with the balancing composition if a protrusion is detected while the rotatable body is rotated about the rotation axis.

12. A protrusion detecting method according to claim 11, wherein during detection the step (b) a protrusion of the balancing composition is detected by the movement of a moveable member caused by contact of the member with the balancing composition.

13. A protrusion detecting method according to claim 12, wherein the moved member is set apart a predetermined interval from an outer surface of the rotatable body and is arranged in such a manner as to permit movement of the member in a direction away from said outer surface, said member being movable by thrusting pressure exerted by the balancing composition when said rotatable body is rotated.

14. A protrusion detecting method according to claim 13, wherein the amount of protrusion of the balancing material is determined at the detecting step (b) by the amount of movement of the moving member caused by contact of the member with the balancing composition.

15. A protrusion detecting apparatus for detecting the existence of protrusion of a balancing composition beyond a predetermined dimension of a rotatable body, the balancing composition having been placed on the rotatable body for correcting a dynamic balance of the rotatable body, said protrusion detecting device comprising:
  supporting means for supporting the rotatable body in such a manner as to permit its rotation round a rotation axis thereof;
  driving means for rotating said rotatable body round the axis; and
  detecting means for detecting the existence of protrusion of the balancing composition beyond the predetermined dimension of the rotatable body while said rotatable body is being rotated by the driving means.

16. A protrusion detecting apparatus according to claim 15, wherein said detecting means comprises:
  moving members having a surface area confronting the rotatable body, said surface area positioned a distance away from the rotatable body corresponding to said predetermined dimension, and movable by contact thereof with the balancing composition and
  a detecting part which detects the amount of movement of said moving members.

17. A protrusion detecting apparatus according to claim 16, wherein the said protrusion detecting apparatus is provided with a pickup movable by the movement of the moving members and a display part for displaying the amount of movement of said pickup.

18. A protrusion detecting apparatus according to claim 15, further comprising:
  a light irradiating means for irradiating a beam of light in the direction of a tangential line corresponding to the predetermined dimension of the rotating body, and
  a light receiving means which is arranged in such a manner as to be in a position opposite to said light irradiating means for receiving the light irradiated.

19. A protrusion detecting apparatus according to claim 18, wherein said protrusion detecting device is provided with a determining means for determining the existence of a protrusion of balancing composition beyond the predetermined dimension of the rotating body when the light irradiated by the light irradiating means is blocked by the protrusion and not received by the light receiving means.

20. A protrusion detecting apparatus according to claim 19, wherein the light irradiating means comprises of a laser light irradiating device which emits a beam of laser light and the light receiving means comprises of a laser light detecting unit which detects rays of laser light.

21. A method of correcting the dynamic balance of a rotatable body, comprising the steps of:
   (a) measuring the location and amount of a dynamic unbalance in the rotatable body;
   (b) applying a balancing composition to the rotatable body dependent on the measurement of the location and amount of the dynamic unbalance in the rotatable body;
   (c) determining the state of the dynamic balance of the rotatable body and thereafter hardening the balancing composition applied to the rotatable body; and
   (d) detecting the existence of protrusion of the balancing composition applied to the rotatable body beyond a predetermined dimension of the rotatable body by bringing a detecting member into close proximity of the rotatable body such that the detecting member will make contact with the balancing composition if a protrusion is detected, while rotating the balancing composition together with the rotatable body.

22. A method of correcting the dynamic balance of a rotatable body according to claim 21, further comprising the step of pressing the balancing composition onto the rotatable body after the applying step (b) such that the balancing composition is fixed to the rotatable body.

23. A method of correcting the dynamic balance of a rotatable body, comprising the steps of:
   (a) measuring the location and amount of a dynamic unbalance in the rotatable body;
   (b) applying a balancing composition to the rotatable body dependent on the measurement of the location and amount of the dynamic unbalance in the rotatable body;
   (c) determining the state of the dynamic balance of the rotatable body and thereafter hardening the balancing composition applied to the rotatable body; and
   (d) detecting the existence of protrusion of the balancing composition applied to the rotatable body beyond a predetermined dimension of the rotatable body by irradiating a beam of light in the direction of a tangential line of a predetermined outside configuration of the rotatable body while rotating said rotatable body.

24. A protrusion detecting method for detecting the existence of protrusion of a balancing composition beyond a predetermined dimension of a rotatable body, the balancing composition having been placed on a rotatable body in order to correct the dynamic balance of the rotatable body, said rotatable body having a rotation axis about which the body may rotate, said method comprising the steps of:
   (a) supporting the rotatably body such that the body may rotate about the rotation axis; and
   (b) detecting the existence of protrusion of the balancing composition beyond a predetermined dimension of the rotatable body by irradiating a beam of light in the direction of a tangential line of a predetermined outside configuration of the rotatable body while the rotatable body is rotated about the rotation axis.

25. A protrusion detecting method according to claim 24, wherein the beam of light is a beam of laser light.

* * * * *